US012810763B2

(12) United States Patent
Liao et al.

(10) Patent No.: US 12,810,763 B2
(45) Date of Patent: Nov. 24, 2026

(54) PIXEL CIRCUIT AND DISPLAY PANEL

(71) Applicant: PlayNitride Display Co., Ltd., MiaoLi County (TW)

(72) Inventors: Kuan-Yung Liao, MiaoLi County (TW); Cheng-Chi Lo, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 0 days.

(21) Appl. No.: 19/063,304

(22) Filed: Feb. 26, 2025

(65) Prior Publication Data

US 2026/0155076 A1 Jun. 4, 2026

(30) Foreign Application Priority Data

Dec. 4, 2024 (TW) ................................ 113146975

(51) Int. Cl.

| | |
|---|---|
| ***G09G 3/20*** | (2006.01) |
| ***G09G 3/32*** | (2016.01) |
| ***G09G 3/3225*** | (2016.01) |

(52) U.S. Cl.

CPC ......... *G09G 3/2007* (2013.01); *G09G 3/3225* (2013.01); *G09G 3/32* (2013.01); *G09G 2300/0842* (2013.01); *G09G 2310/08* (2013.01)

(58) Field of Classification Search

CPC ...... G09G 3/2007; G09G 3/3225; G09G 3/32; G09G 2300/0842; G09G 2310/08; G09G 3/3233

See application file for complete search history.

(56) References Cited

U.S. PATENT DOCUMENTS 11,122,660 B2 * 9/2021 Chiang .................. H05B 45/44
11,462,151 B2 * 10/2022 Hashimoto .......... G09G 3/3233

(Continued)

FOREIGN PATENT DOCUMENTS

CN 102725797 A 10/2012
JP 2013524391 A 6/2013

OTHER PUBLICATIONS

"Office Action of Taiwan counterpart Application", issued on Oct. 16, 2025, p. 1-p. 4.

*Primary Examiner* — Grant Sitta
(74) *Attorney, Agent, or Firm* — JCIPRNET

(57) ABSTRACT

A pixel circuit includes two switch transistors, a scan line, two driving transistors, a signal source, and a light-emitting component. Each switching transistor has a channel, a gate-source voltage difference of each switch transistor has a potential interval for turning on the corresponding channel, and the potential intervals do not overlap. The scan line is electrically connected to a gate of each switch transistor to transmit a selection signal enabling the gate-source voltage difference to be in the corresponding potential interval of one of the switch transistors. In a saturation operation condition, slopes of tangent lines of transfer characteristic curves corresponding to a same gate-source voltage difference of the driving transistors are different. The signal source and the light-emitting component are connected between two ends of the driving transistors, or the light-emitting component is connected between the signal source and the driving transistors. A display panel is also provided.

14 Claims, 9 Drawing Sheets

(56) References Cited

U.S. PATENT DOCUMENTS

| | | | | |
|---|---|---|---|---|
| 2006/0152450 | A1 * | 7/2006 | Giraldo | G09G 3/32<br>345/76 |
| 2009/0097318 | A1 | 4/2009 | Sarin et al. | |
| 2009/0309856 | A1 * | 12/2009 | Yoo | G09G 3/3233<br>345/82 |
| 2016/0027504 | A1 | 1/2016 | Lee | |
| 2016/0240139 | A1 * | 8/2016 | Yang | G09G 3/3258 |
| 2021/0335244 | A1 * | 10/2021 | Ohara | G09G 3/32 |
| 2022/0020315 | A1 * | 1/2022 | Cok | H03K 3/017 |
| 2024/0046866 | A1 * | 2/2024 | Hu | G09G 3/3233 |

* cited by examiner

PIXEL CIRCUIT AND DISPLAY PANEL

CROSS-REFERENCE TO RELATED APPLICATION

This application claims the priority benefit of Taiwan application serial no. 113146975, filed on Dec. 4, 2024. The entirety of the above-mentioned patent application is hereby incorporated by reference herein and made a part of this specification.

BACKGROUND

Technical Field

The disclosure relates to a pixel circuit and a display panel, and particularly relates to a pixel circuit and a display panel capable of enhancing the luminance contrast performance of a display at low grayscale levels.

Description of Related Art

With reference to FIG. 1, which is a curve illustrating a relationship between displayed luminance L of a pixel circuit and the number of grayscale levels. In FIG. 1, the horizontal axis and the vertical axis respectively represent the grayscale value of a control integrated circuit (IC) and the corresponding luminance of the light-emitting chip it controls. Curves 110 to 130 correspond to different gamma values, where curve 110 is the standard gamma value curve (1.0). To improve the luminance difference performance of the display in low grayscale scenes, there are also settings with higher gamma values such as curves 120 and 130. When the gamma value used by the control IC increases, it means that at low gray levels, the luminance difference of each level is compressed smaller, and a more detailed dark field contrast is presented. However, this control technique demands higher requirements for the electrical control technology of light-emitting components such as micro light-emitting diodes (micro LEDs).

In actual pixel circuits, the display luminance of a light-emitting component is controlled by voltage, and as the light-emitting efficiency of chips continues to improve, the luminance performance of chips in the low voltage interval has also significantly improved. This means that the voltage controlling the luminance needs to be divided more densely to accurately present subtle luminance differences, bringing new challenges to the control capability of the control IC. Especially for curves with higher gamma value settings, the voltage difference corresponding to each grayscale level in the low grayscale interval is further reduced, making it more difficult for the control IC to adjust the voltage.

SUMMARY

The disclosure provides a pixel circuit and a display panel capable of adjusting the driving method according to the high or low display luminance to optimize the generated display quality.

The disclosure provides a pixel circuit including two switch transistors, a scan line, and two driving transistors. Each of the two switch transistors has a channel, a switch source, and a switch gate. A first potential difference between each switch gate and the corresponding switch source has a potential interval that enables the corresponding channel to be turned on, and the potential intervals of the two switch transistors do not overlap with each other. The scan line is electrically connected to the switch gate of each switch transistor and is configured to transmit a selection signal to enable the first potential difference of one of the switch transistors to be located in the corresponding potential interval. Each of the driving transistors has a driving source and a driving gate. Each of the driving gates is connected to the channel of each of the corresponding switch transistors. A second potential difference is provided between each of the driving gates and the corresponding driving source. In a saturation operation condition, transfer characteristic curves of the two driving transistors corresponding to the same second potential difference have different tangent slopes. The pixel circuit further includes a signal source and a light-emitting component. The signal source is electrically connected to one end of each of the two driving transistors. The light-emitting component is electrically connected to the other end of each of the two driving transistors or is electrically connected between the signal source and the end of the two driving transistors.

The disclosure further provides a display panel including a substrate, a plurality pixel circuits according to the above, a plurality of control lines, and a plurality of control units. Each of the control lines is electrically connected between the two channels of the two switch transistors in one of the pixel circuit and is configured to transmit a control signal to the two driving gates. Each of the control units is electrically connected to part of the pixel circuits and controls the output of the selection signals, the control signals, and the signal sources to the pixel circuits.

To sum up, the pixel circuit of the disclosure provides two transistors with different electrical properties to drive the same light-emitting component. By using the driving transistors with different characteristics to drive the light-emitting component to generate different luminance levels, especially in low luminance level situations, the difficulty of controlling the voltage of the light-emitting component is effectively lowered, and the dark field contrast performance of the display panel is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
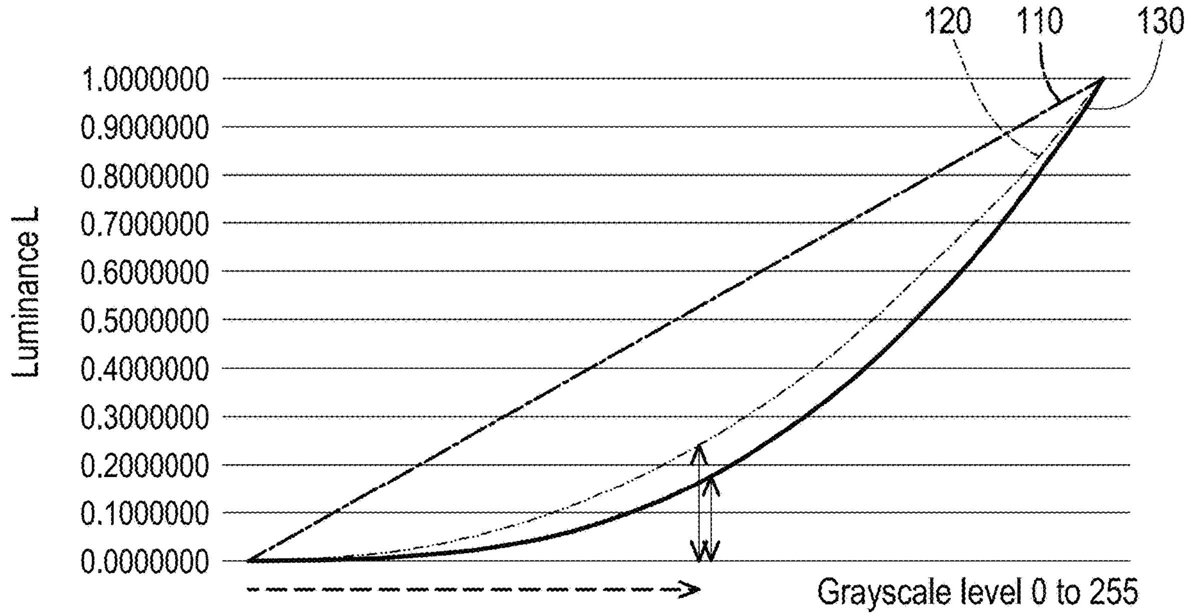
FIG. 1 (RELATED ART)
FIG. 1 is a curve illustrating a relationship between displayed luminance L of a pixel circuit and the number of grayscale levels.
Figure 2:
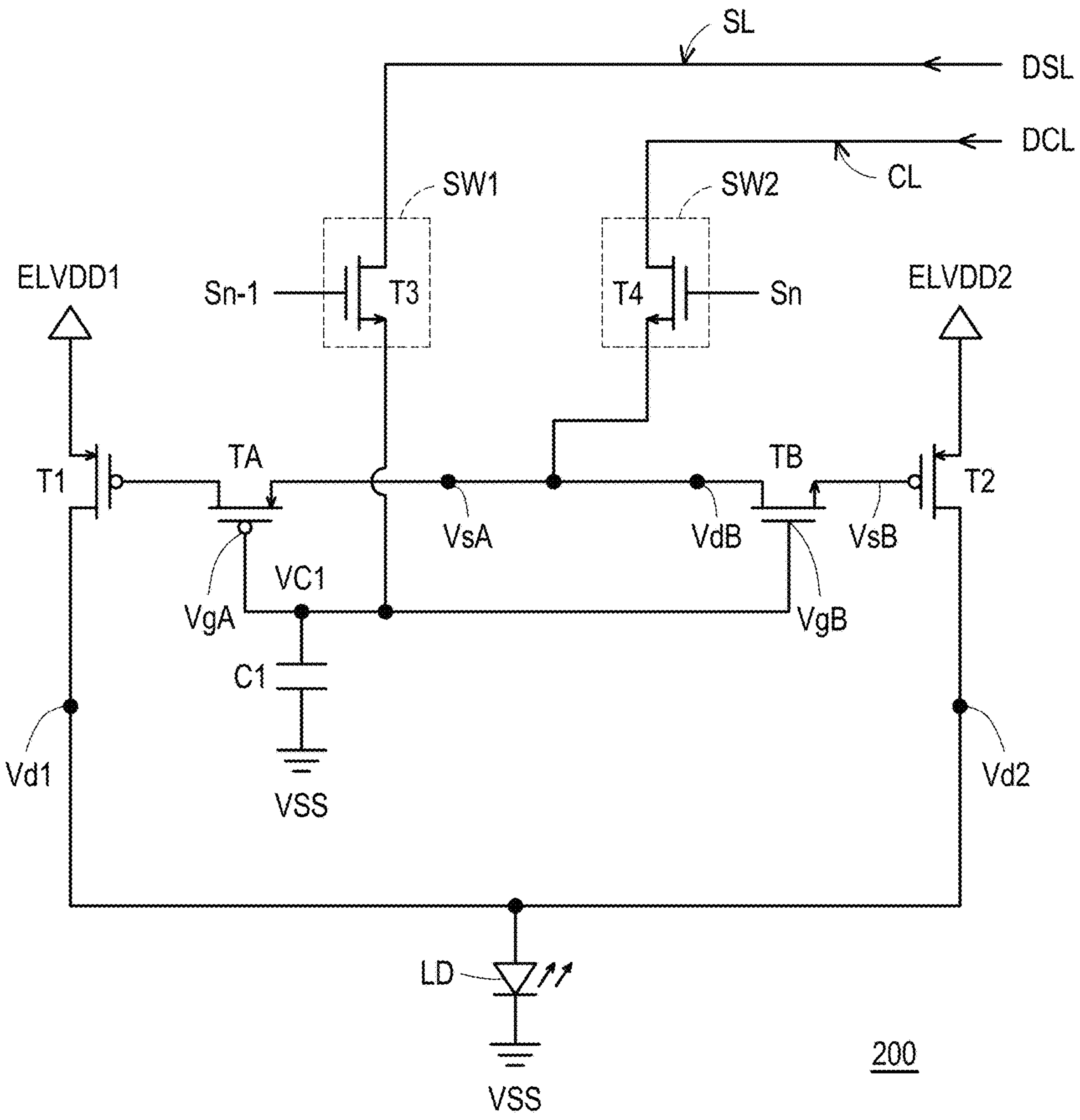
FIG. 2 is a schematic diagram illustrating a pixel circuit according to an embodiment of the disclosure.

With reference to FIG. 2, which is a schematic diagram illustrating a pixel circuit according to an embodiment of the disclosure. A pixel circuit 200 includes switch transistors TA and TB, driving transistors T1 and T2, a storage capacitor C1, a scan line SL, a control line CL, potential holding switches SW1 and SW2, signal sources ELVDD1 and ELVDD2, and a light-emitting component LD. In this embodiment, each of the switch transistors TA and TB has a channel, a switch source, a switch drain, and a switch gate. The channel of the switch transistor TA may be formed between its switch source and switch drain, and the channel of the switch transistor TB may be formed between its switch source and switch drain. When a potential difference between a potential VgA of the switch gate of switch transistor TA and a potential VsA of its corresponding switch source falls within a first potential interval, the channel of switch transistor TA may be turned on. Similarly, when a potential difference between a potential VgB of the switch gate of switch transistor TB and a potential VsB of its corresponding switch source falls within a second potential interval, the channel of switch transistor TB may be turned on. Moreover, the aforementioned first potential interval and second potential interval do not overlap with each other.

In this embodiment, the switch transistor TA and the switch transistor TB may be transistors with different conductive polarities. For instance, the switch transistor TA may be a P-type metal-oxide-semiconductor field-effect transistor (MOSFET), while the switch transistor TB may be an N-type metal-oxide-semiconductor field-effect transistor (MOSFET).

The scan circuit SL may be electrically connected to the switch gates of the switch transistors TA and TB through the potential holding switch SW1, so as to transmit a selection signal DSL to the switch gates of the switch transistors TA and TB. The control line CL may be electrically connected between the two channels of the switch transistors TA and TB through the potential holding switch SW2, so as to transmit a control signal DCL to the channels of switch transistors TA and TB.

The storage capacitor C1 may be coupled between the switch gates of the switch transistors TA and TB and a reference grounding terminal VSS. In this embodiment, the switch gates of the switch transistors TA and TB are coupled to each other. The storage capacitor C1 is used to hold a potential VC1 generated at the switch gates of the switch transistors TA and TB based on receiving the selection signal DSL. In this embodiment, the potential holding switch SW1 may be constructed by a transistor T3. A channel of the transistor T3 may be turned on or turned off according to a sequence signal Sn−1. When the channel of transistor T3 is turned on, the selection signal DSL may be transmitted to the switch gates of the switch transistors TA and TB to charge the storage capacitor C1. While the potential VC1 on the storage capacitor C1 equals a potential of the selection signal DSL, the channel of the transistor T3 may be turned off according to the sequence signal Sn−1.

Figure 3:
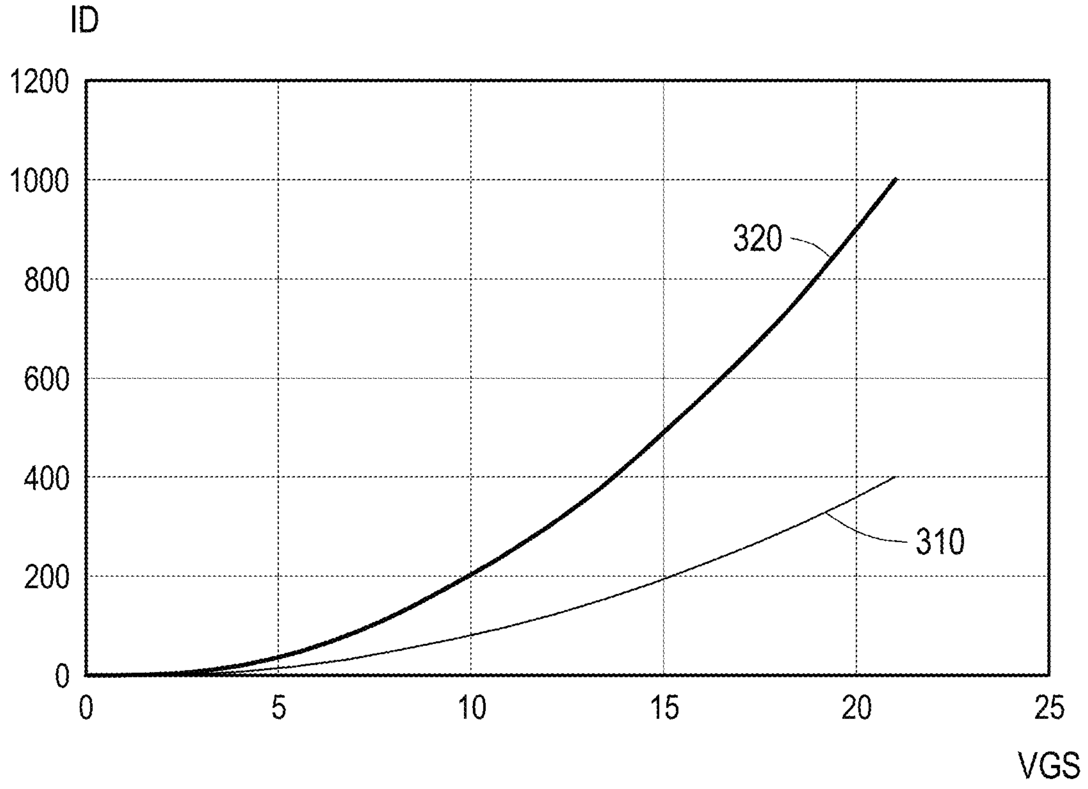
FIG. 3 is a chart illustrating a transfer characteristic curve of a driving transistor according to an embodiment of the disclosure.

Each of the driving transistors T1 and T2 may have a driving source, a driving drain, and a driving gate. The driving gate of the driving transistor T1 is connected to the channel of the switch transistor TA, and the driving gate of the driving transistor T2 is connected to the channel of the switch transistor TB. A potential difference may be provided between the driving gate of each of the driving transistors T1 and T2 and its corresponding driving source. When the driving transistors T1 AND T2 operate in a saturation region, for the same potential difference, transfer characteristic curves of the driving transistors T1 and T2 have different tangent slopes. As shown in FIG. 3, a chart illustrating a transfer characteristic curve of a driving transistor according to an embodiment of the disclosure, in FIG. 3, a horizontal axis represents a potential difference VGS between the driving gate and its corresponding driving source, while a vertical axis represents a current of the driving drain. When the driving transistor T1 operates in the saturation region, it corresponds to a transfer characteristic curve 310, and when the driving transistor T2 operates in the saturation region, it corresponds to a transfer characteristic curve 320.

Herein, when corresponding to the same potential difference VGS between the driving gate and the driving source, the transfer characteristic curve 310 and the transfer characteristic curve 320 clearly have different tangent slopes. In the embodiments of the disclosure, when corresponding to the same potential difference VGS between the driving gate and driving source, an absolute value of a first slope of a tangent to the transfer characteristic curve 310 of the driving transistor T1 may be less than an absolute value of a second slope of a tangent to the transfer characteristic curve 320 of the driving transistor T2. The second slope may be more than twice the first slope.

With reference to FIG. 2 again, in this embodiment, the driving sources of the driving transistors T1 and T2 may be coupled to the signal sources ELVDD1 and ELVDD2 respectively. The signal sources ELVDD1 and ELVDD2 may be the same voltage sources (e.g., in parallel) or may be two separate independent voltage sources. The driving drains of the driving transistors T1 and T2 may be commonly coupled to the light-emitting component LD. In this embodiment, the light-emitting component LD is, for example, a light-emitting diode (e.g., an organic light-emitting diode, a micro light-emitting diode, or any other form of light-emitting diode), and may also be a light-emitting diode chip. Herein, an anode of the light-emitting component LD may be coupled to the driving drains of the driving transistors T1 and T2, while a cathode of the light-emitting component LD is coupled to the reference grounding terminal VSS.

The potential holding switch SW2 may be constructed using a transistor T4. A channel of the transistor T4 may be turned on or turned off according to a sequence signal Sn. When the channel of the transistor T4 is turned on, the control signal DCL may be transmitted to the channels of the switch transistors TA and TB. When potentials on the channels of the switch transistors TA and TB equal a potential of the control signal DCL, the channel of the transistor T4 may be turned off according to the sequence signal Sn.

In this embodiment, when either of the switch transistors TA and TB is turned on, the potential equal to that of the control signal DCL may be transmitted through the turned-on switch transistor TA or TB to the driving gate of the corresponding driving transistor T1 or T2. Taking the driving transistors T1 and T2 as P-type MOSFETs for example, when the potential difference (Vgs) between the driving gate and driving source of either the driving transistor T1 or T2 is less than a negative threshold voltage (Vth) of the driving transistors T1 and T2, the channel of the corresponding driving transistor T1 or T2 may be turned on.

The driving transistors T1 and T2 with turned on channels may provide driving potentials Vd1 and Vd2 respectively at their drain terminals to the light-emitting component LD. In this embodiment, the driving potentials Vd1 and Vd2 may be provided to the anode of the light-emitting component LD and thereby drive the light-emitting component LD to emit light. The driving potentials Vd1 and Vd2 may equal the signal sources ELVDD1 and ELVDD2 respectively, with the driving transistors T1 and T2 used to write the signal sources ELVDD1 and ELVDD2 into the light-emitting component LD respectively.

Regarding the operational details of the pixel circuit 200, in this embodiment, the potential holding switch SW1 may be turned on earlier than the potential holding switch SW2. During a first time interval, the potential holding switch SW1 is turned on first according to the sequence signal Sn−1 and is used to transmit the selection signal DSL to the switch gates of the switch transistors TA and TB. Through charging the storage capacitor C1, the potentials VgA and VgB on the switch gates of the switch transistors TA and TB are both equal to the potential of the selection signal DSL. Therefore, only one of the switch transistors TA and TB having non-overlapping potential intervals that can be turned on can be turned on, and the other one is not turned on.

In the embodiments of the disclosure, when target light-emitting luminance of the light-emitting component LD is a relatively low first grayscale level, the scan line SL may, during the first time interval, enable the switch transistor TA to be turned on by transmitting the selection signal DSL. When the target light-emitting luminance of the light-emitting component LD is a relatively high second grayscale level, the scan line SL may, during the first time interval, enable the switch transistor TB to be turned on by transmitting the selection signal DSL.

In the design, threshold voltage absolute values of the switch transistors TA and TB may be made the same (with opposite signs). This may prevent the threshold voltages of the switch transistors TA and TB from overlapping due to process parameter drift.

Incidentally, in the embodiments of the disclosure, a grayscale level threshold may be preset. When the target light-emitting luminance of the light-emitting component LD is not higher than the grayscale level threshold, the channel of the switch transistor TA may be turned on. When the target light-emitting luminance of the light-emitting component LD is higher than the grayscale level threshold, the channel of the switch transistor TB may be turned on.

During the second time interval following the first time interval, the switch SW2 may be turned on according to the sequence signal Sn. The turned-on switch SW2 may transmit the control signal DCL to the coupled switch source of the switch transistor TA and the switch drain of the switch transistor TB and make the potential VsA of the switch source and the potential VdB of the switch drain equal to the potential of the control signal DCL. When the switch transistor TA is turned on, the potential on the driving gate of the driving transistor T1 may be substantially equal to the potential VsA. When the switch transistor TB is turned on, the potential on the driving gate of the driving transistor T2 may be substantially equal to the potential VdB. Accordingly, the driving transistors T1 and T2 may respectively determine the generated driving potentials Vd1 and Vd2 according to the potentials on their driving gates and drive the light-emitting component LD to emit light.

In other words, after the grayscale level judgment based on the aforementioned threshold is completed, the selection signal DSL may determine whether the channel of the switch transistor TA or TB is turned on. Next, the voltage of the control signal DCL may be determined corresponding to the grayscale level of the target light-emitting luminance to be generated by the pixel circuit 200 as well as the potential VgA (or potential VgB) of the switch gate of the currently turned on switch transistor TA (or switch transistor TB). In detail, when the grayscale level of the target light-emitting luminance to be generated by the pixel circuit 200 falls within a lower first grayscale level interval, the pixel circuit 200 controls to turn on the channel of the switch transistor TA according to the selection signal DSL and controls the emission luminance of the light-emitting component LD through the driving transistor T1 according to the voltage of the control signal DCL. Conversely, when the grayscale level of the target light-emitting luminance to be generated by the pixel circuit 200 falls within a higher second grayscale level interval, the channel of the switch transistor TB is turned on, and the driving transistor T2 controls the light-emitting luminance of the light-emitting component LD according to the voltage of the control signal DCL.

In this embodiment, taking 256 grayscale levels as an example, the aforementioned first grayscale level interval may be set between 0 and 100, and the second grayscale level interval may be set between 101 and 255. Herein, the number of grayscale levels of the second grayscale level interval is approximately 1.5 times the number of grayscale levels of the first grayscale level interval. Alternatively, in other embodiments, the aforementioned first grayscale level interval may be set between 0 and 64, and the second grayscale level interval may be set between 65 and 255. In this case, the number of grayscale levels of the second grayscale level interval is 3 times that of the first grayscale level interval.

Figure 4:
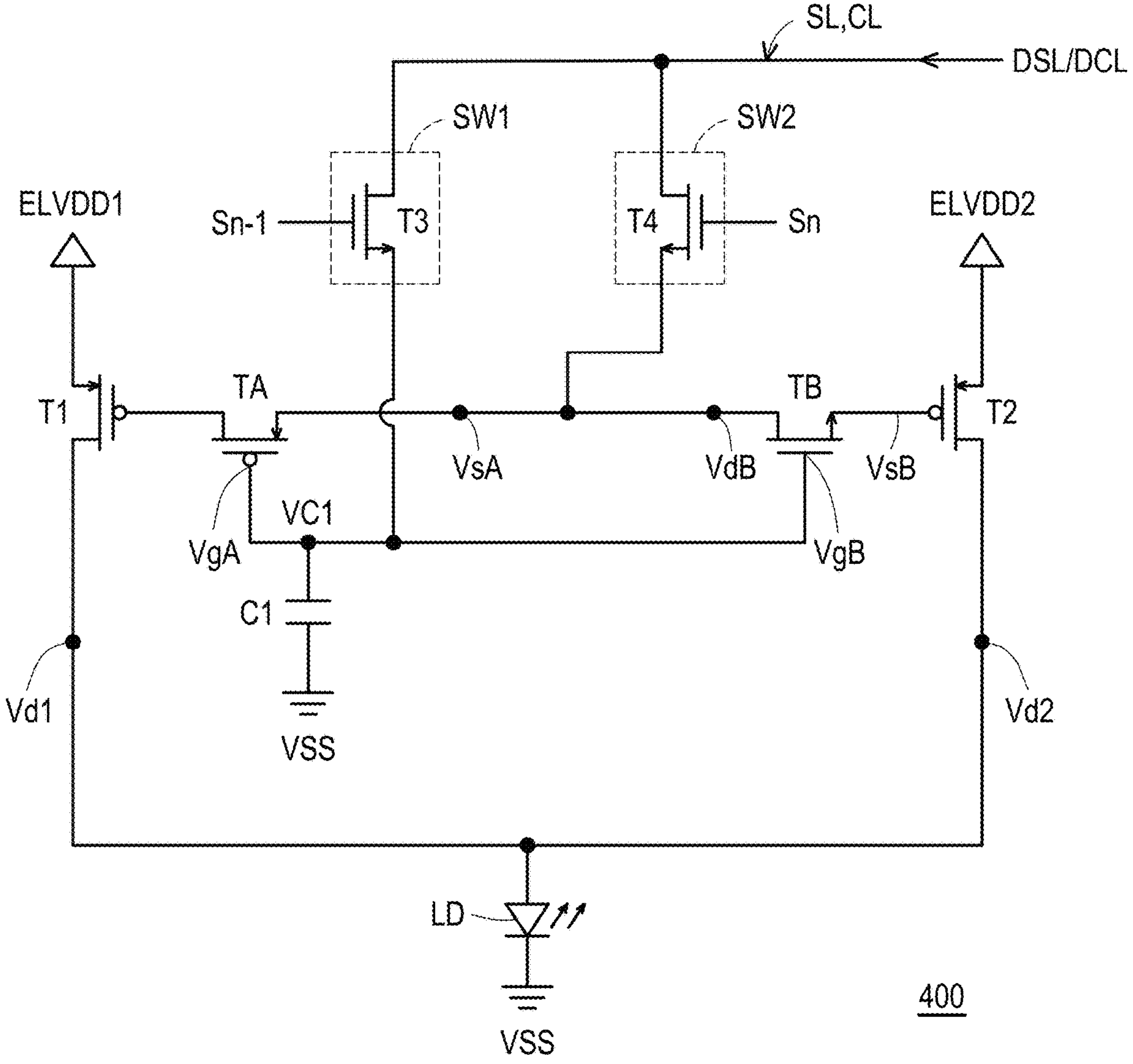
FIG. 4 is a schematic diagram illustrating a pixel circuit according to another embodiment of the disclosure.

With reference to FIG. 4, FIG. 4 is a schematic diagram illustrating a pixel circuit according to another embodiment of the disclosure. A pixel circuit 400 includes the switch transistors TA and TB, the driving transistors T1 and T2, the storage capacitor C1, the scan line SL, the control line CL, the potential holding switches SW1 and SW2, the signal sources ELVDD1 and ELVDD2, and the light-emitting component LD. The pixel circuit 400 includes the same circuit components as the pixel circuit 200, where the same parts are not to be described in detail. The difference from the foregoing embodiments is that in the pixel circuit 400, the scan line SL and the control line CL share the same line. Under this condition, the selection signal DSL and the control signal DCL may be transmitted through the aforementioned shared line, by utilizing different time intervals of the sequence signals Sn−1 and Sn when the switches SW1 and SW2 are turned on respectively.

Figure 5A:
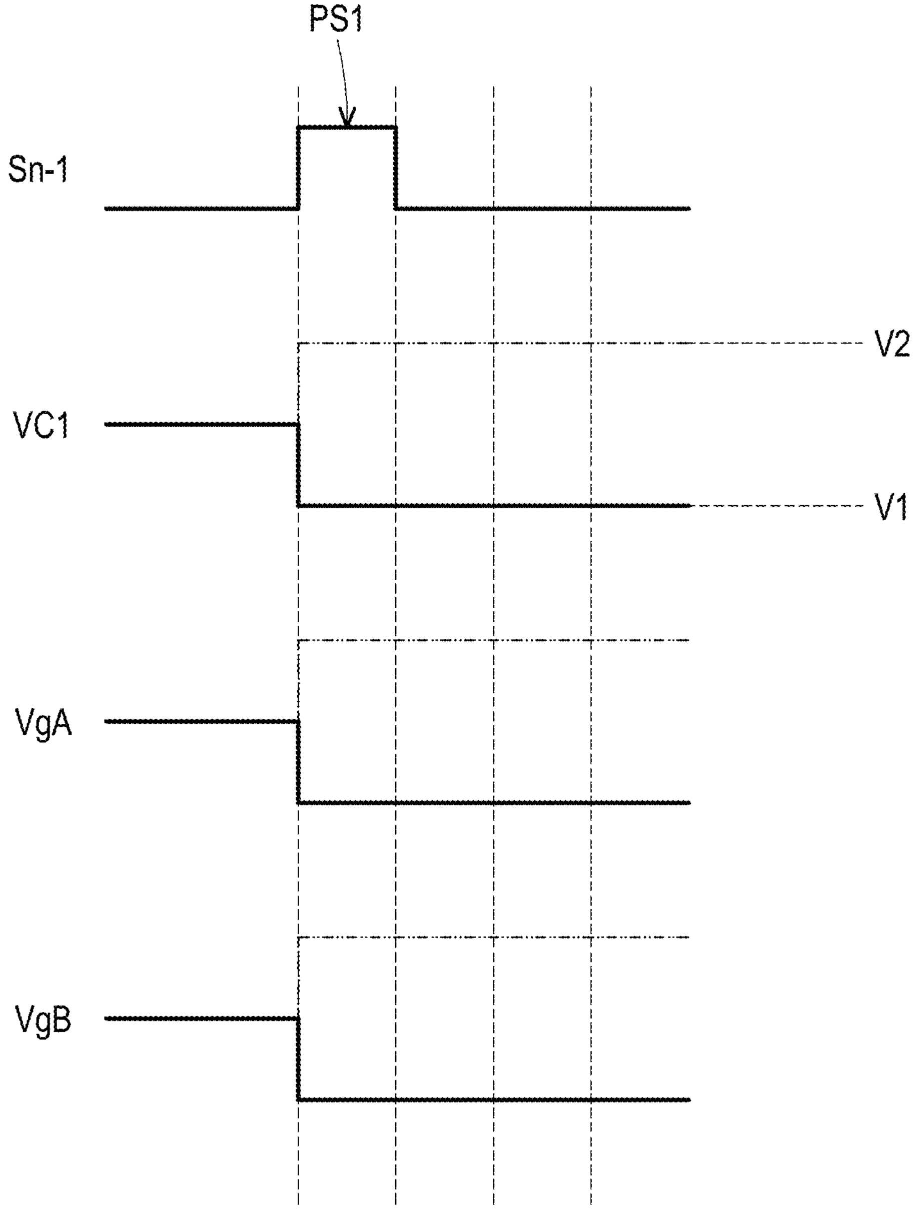
FIG. 5A and FIG. 5B are waveform diagrams illustrating operations of the pixel circuit.
Figure 5B:
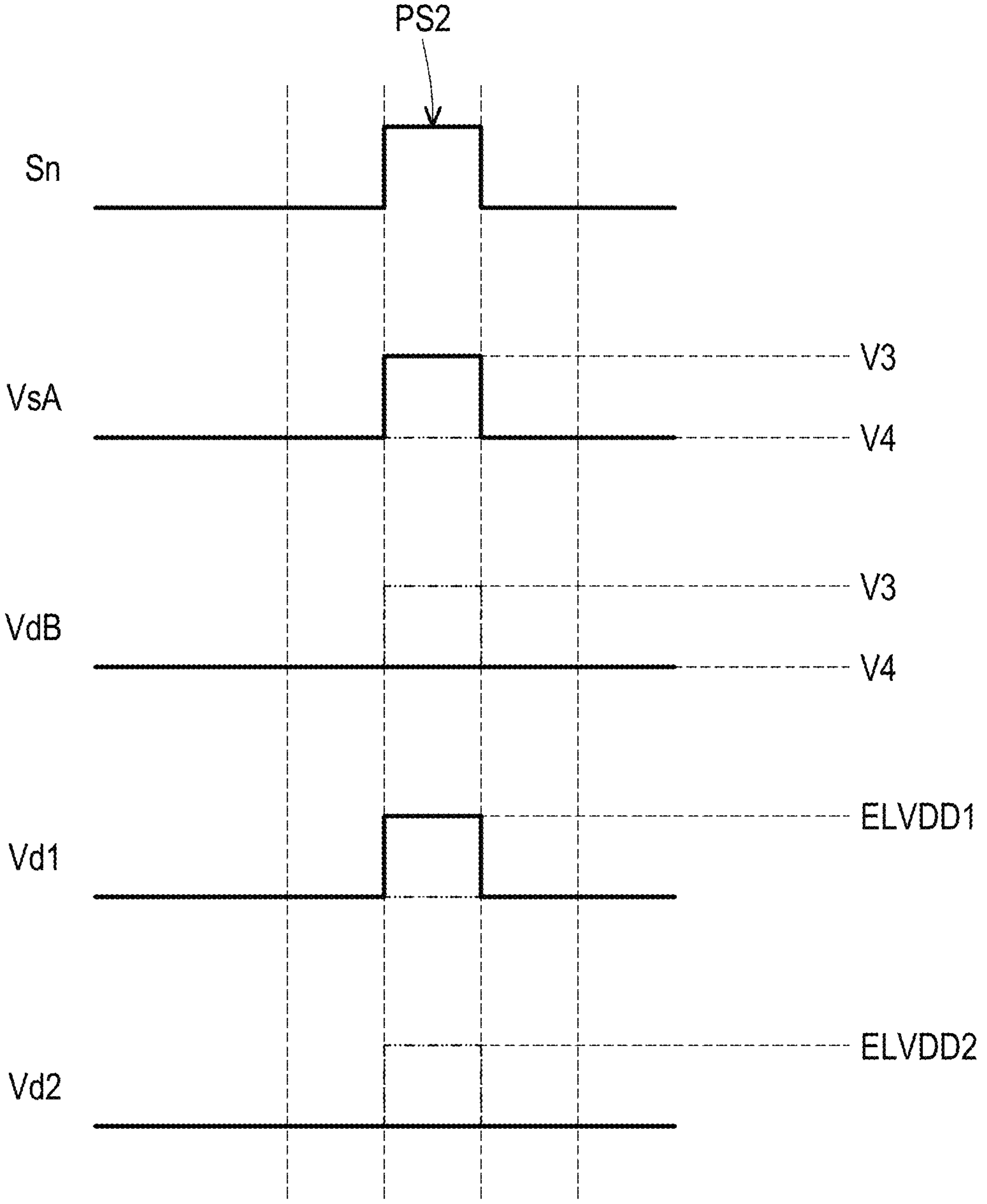

Regarding the operational details of the pixel circuit 400, please refer to FIG. 5A and FIG. 5B together. FIG. 5A and FIG. 5B are waveform diagrams illustrating operations of the pixel circuit. In FIG. 5A, during the first time interval, the sequence signal Sn−1 may be enabled and provide a positive pulse PS1. Correspondingly, the switch SW1 is turned on and transmits the selection signal DSL provided on the scan line SL to the capacitor C1. When the selection signal DSL is at a relatively high potential V2, the potential VC1 on the capacitor C1 is charged to the potential V2. Conversely, when the selection signal DSL is at a relatively low potential V1, the potential VC1 on the capacitor C1 may equal the potential V1. Based on selection gates of the switch transistors TA and TB both being coupled to the capacitor C1, the potentials VgA and VgB of the switch gates of the switch transistors TA and TB may be the same as the potential VC1.

Taking the switch transistors TA and TB as P-type and N-type MOSFETs respectively as an example, in this case, when the potential VC1 on the capacitor C1 is at the relatively high potential V2, the switch transistor TB may be turned on. Conversely, when the potential VC1 on the capacitor C1 is at the relatively low potential V1, the switch transistor TA may be turned on.

Next, in FIG. 5B, during the second time interval, the sequence signal Sn may be enabled and provide another positive pulse PS2. Correspondingly, the switch SW2 is turned on and transmits the control signal DCL provided on the control line CL to the channel of the switch transistor TA or TB.

Subsequently, if the channel of the switch transistor TA is in a turned-on state at this time, the switch transistor TA may provide the potential VsA on its switch source to the driving gate of the driving transistor T1 and causes the driving transistor T1 to generate a corresponding driving signal Vd1 to drive the light-emitting component LD. If the channel of the switch transistor TB is in a turned-on state at this time, the switch transistor TB may provide the voltage on its switch drain VdB to the driving gate of the driving transistor T2 and causes the driving transistor T2 to generate a corresponding driving signal Vd2 to drive the light-emitting component LD. The driving signals Vd1 and Vd2 may equal the signal sources ELVDD1 and ELVDD2 respectively. The signal sources ELVDD1 and ELVDD2 may be the same or different.

Figure 6:
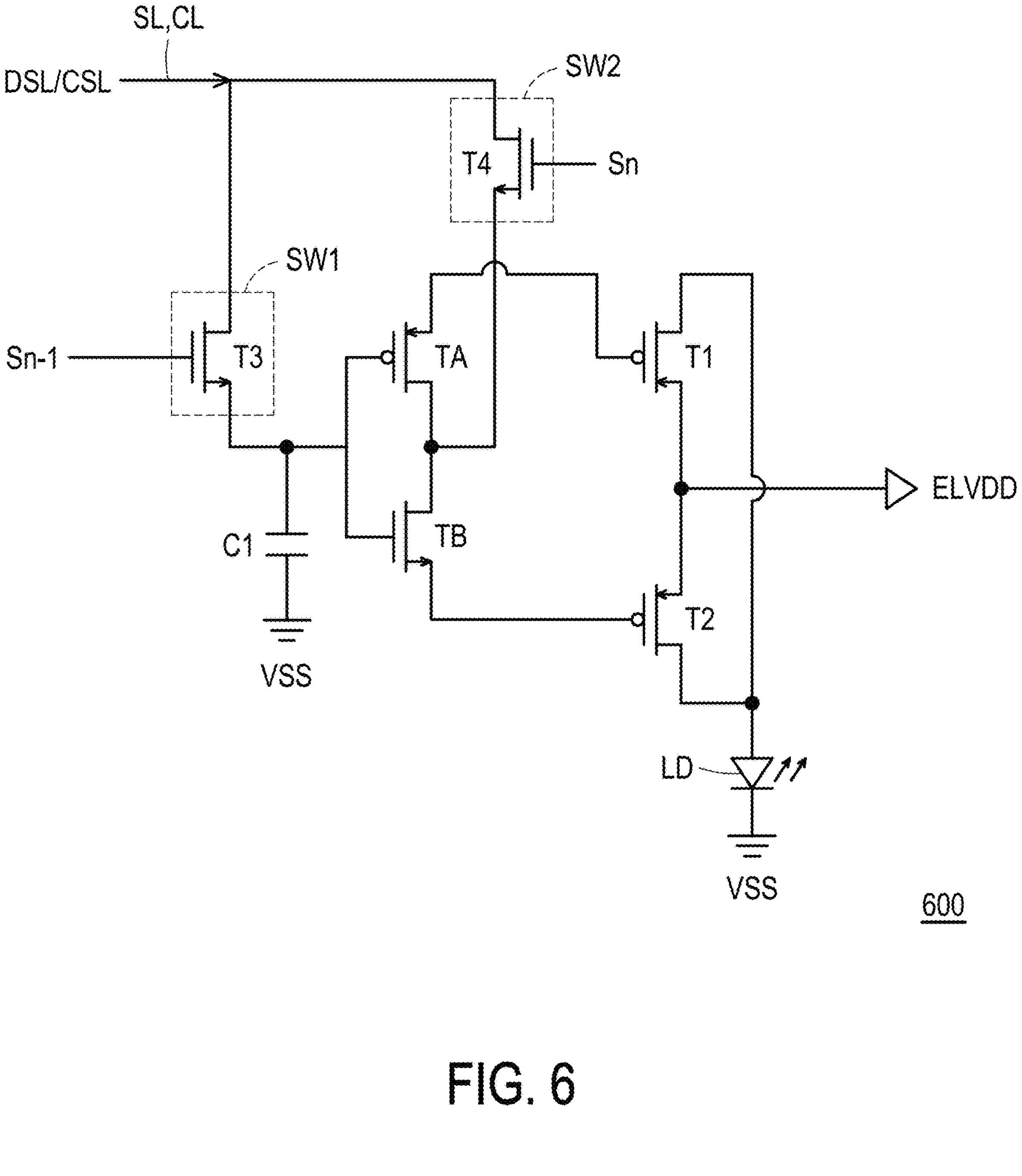
FIG. 6 is a schematic diagram illustrating a pixel circuit according to another embodiment of the disclosure.

With reference to FIG. 6, FIG. 6 is a schematic diagram illustrating a pixel circuit according to another embodiment of the disclosure. A pixel circuit 600 includes the switch transistors TA and TB, the driving transistors T1 and T2, the storage capacitor C1, the scan line SL, the control line CL, the potential holding switches SW1 and SW2, a signal source ELVDD, and the light-emitting component LD. Circuit architectures of the pixel circuit 600 and the pixel circuit 200 are similar, so description of the same parts is not repeated herein. Different from the aforementioned embodiments, the pixel circuit 600 of this embodiment only has a single signal source ELVDD, which is coupled to the driving sources of both the driving transistors T1 and T2.

Figure 7:
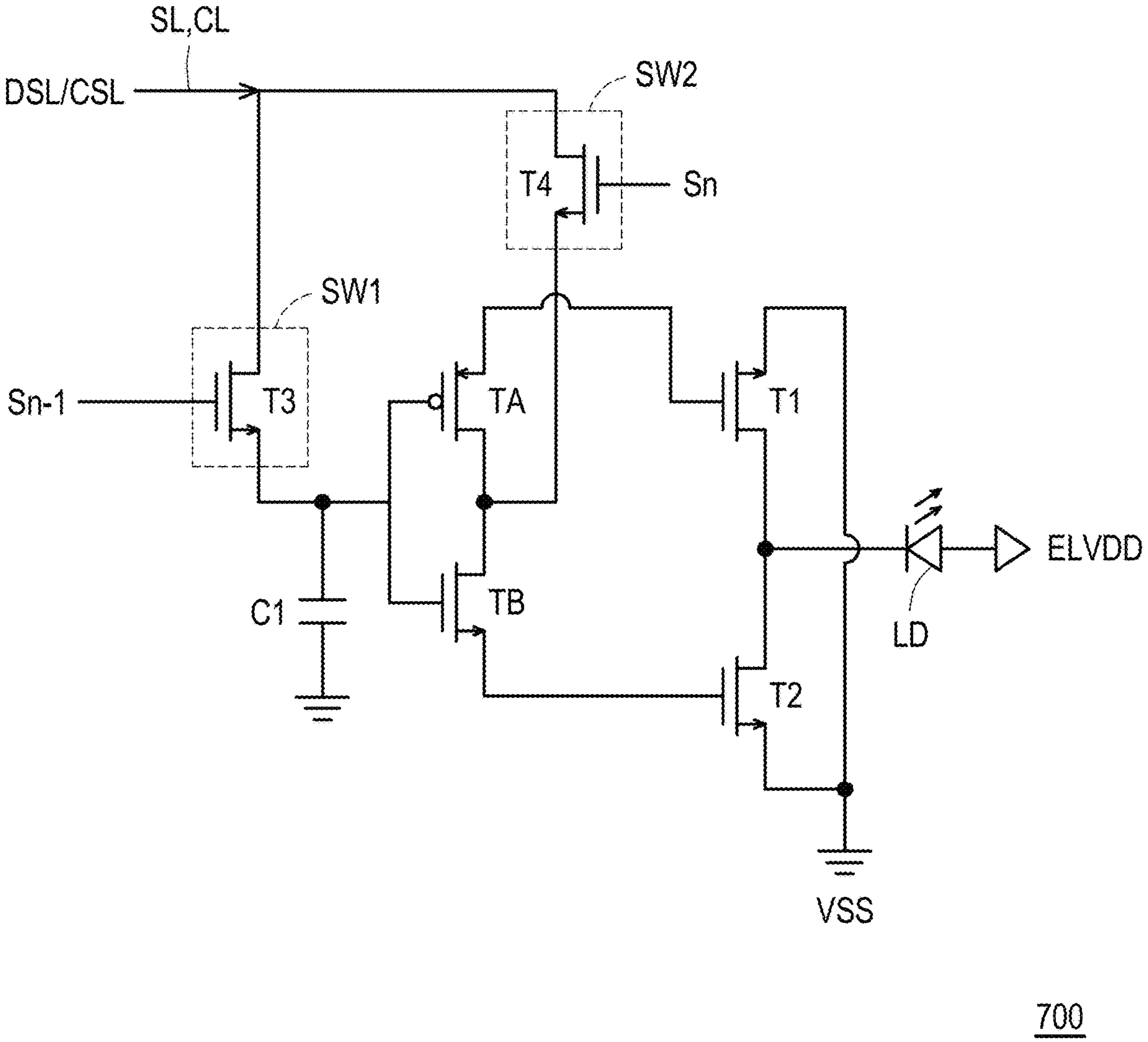
FIG. 7 is a schematic diagram illustrating a pixel circuit according to another embodiment of the disclosure.

With reference to FIG. 7, FIG. 7 is a schematic diagram illustrating a pixel circuit according to another embodiment of the disclosure. A pixel circuit 700 includes the switch transistors TA and TB, the driving transistors T1 and T2, the storage capacitor C1, the scan line SL, the control line CL, the potential holding switches SW1 and SW2, the signal source ELVDD, and the light-emitting component LD. Circuit architectures of the pixel circuit 600 and the pixel circuit 700 are similar, so description of the same parts is not repeated herein. Different from the aforementioned embodiments, in this embodiment, the driving transistors T1 and T2 are N-type MOSFETs, and in the pixel circuit 700, the anode of the light-emitting component LD is coupled to the signal source ELVDD, while the cathode of the light-emitting component LD is coupled to the mutually-coupled driving drains of the driving transistors T1 and T2. The driving sources of the driving transistors T1 and T2 are commonly coupled to the reference grounding terminal VSS.

It is worth noting that in the embodiments of the disclosure, the switch transistors TA and TB may be implemented using transistors with different conduction types. Further, in addition to enhancement-type transistors, at least one of the switch transistors TA and TB may also be a depletion-type transistor. Herein, the types of the switch transistors TA and TB may be as shown in the following table:

| Combination | Switch Transistor A | Switch Transistor B |
|---|---|---|
| 1 | N-type, enhancement-type | P-type, depletion-type |
| 2 | P-type, enhancement-type | N-type, depletion-type |
| 3 | N-type, enhancement-type | P-type, enhancement-type |
| 4 | N-type, depletion-type | N-type, depletion-type |

In the arrangement of the combinations 1 and 2 above, the switch transistors TA and TB belong to the enhancement-type and the depletion-type, respectively. Assuming the switch transistors TA and TB have the same threshold voltage absolute value Vth, the voltage variation of the selection signal DSL transmitted between different pixel circuits may be reduced. Specifically, in combination 1, the conditions for the switch transistors TA and TB to be turned on are that the potential difference between the gate and the source is greater than Vth and less than Vth, respectively; while in combination 2, these turning on conditions become less than-Vth and greater than-Vth, respectively. Therefore, the above arrangement may allow a potential span of the selection signal DSL to be within the same polarity interval, while still being able to selectively turn on either the switch transistor TA or TB, so the control circuit of the selection signal DSL is simplified. For instance, in combination 1, the potential of the selection signal DSL may be controlled to be 0 volts (i.e., power off) or greater than Vth, so the switch transistor TB and the switch transistor TA are turned on.

Figure 8:
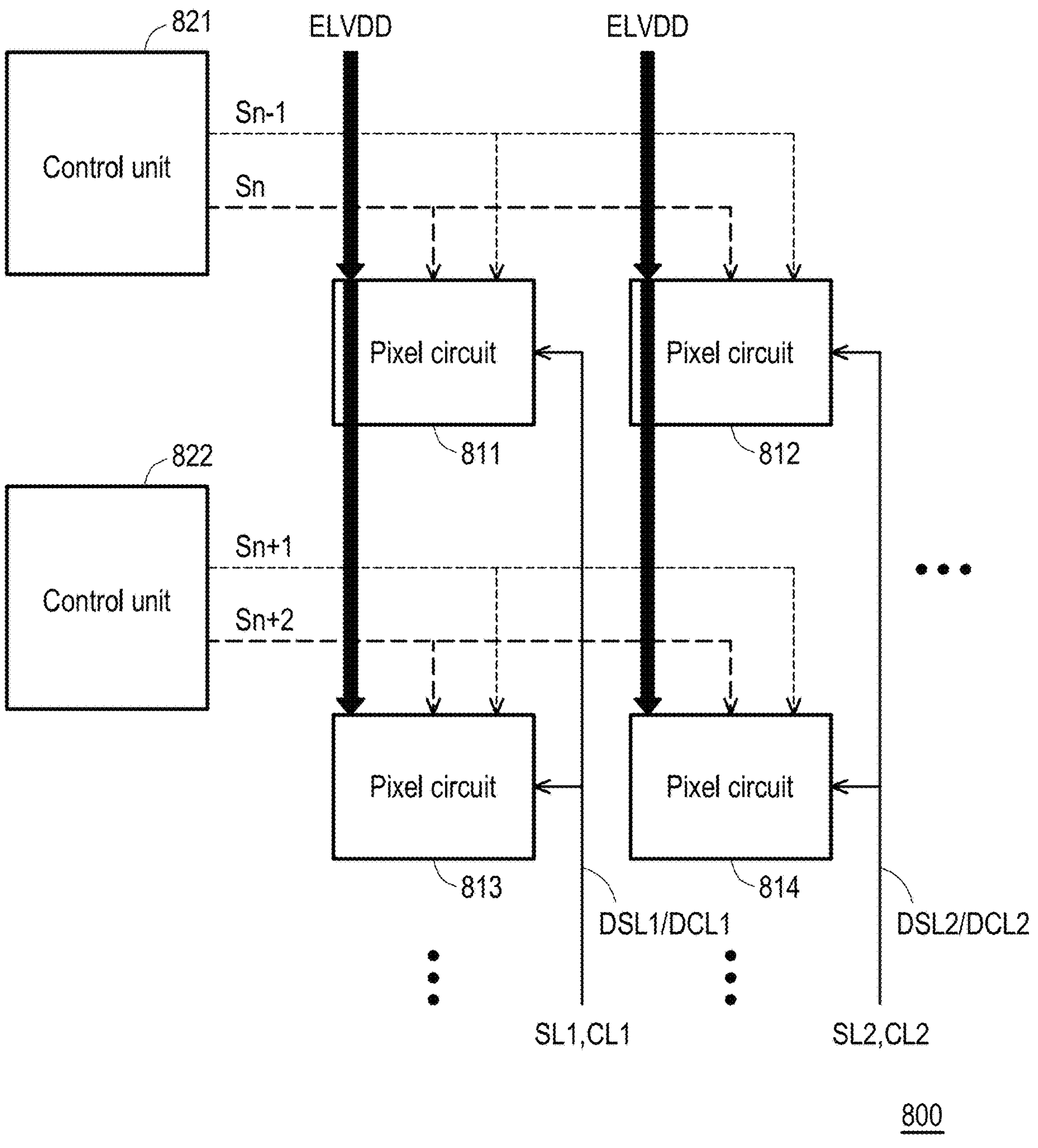
FIG. 8 is a schematic diagram illustrating a display panel according to an embodiment of the disclosure.

With reference to FIG. 8, FIG. 8 is a schematic diagram illustrating a display panel according to an embodiment of the disclosure. A display panel 800 includes a plurality of pixel circuits 811 to 814 and a plurality of control units 821 and 822. The pixel circuits 811 to 814 are arranged in a pixel array. The pixel circuits 811 and 813 in the same column are coupled to the scan line SL1 and the control line CL1, while the pixel circuits 812 and 814 in another column are coupled to the scan line SL2 and the control line CL2. The pixel circuits 811 and 812 in the same row receive the sequence signals Sn−1 and Sn, while the pixel circuits 813 and 814 in another row receive sequence signals Sn+1 and Sn+2. Each of the pixel circuits 811 to 814 may be implemented using the pixel circuits from the aforementioned embodiments, and related details are not elaborated herein.

The control unit 821 is coupled to the pixel circuits 811 and 812, while the control circuit 822 is coupled to the pixel circuits 813 and 814. The control circuits 821 and 822 may be used to execute the sequence control actions for the display operation of the display panel. In this embodiment, the control circuit 821 may generate a selection signal DSL1 and a control signal DCL1 in response to the target light-emitting luminance of each of the pixel circuits 811 and 812. The control circuit 822 may provide a selection signal DSL2 and a control signal DCL2 to the pixel circuits 813 and 814 in response to each of the pixel circuits 813 and 814, corresponding to the sequence signals Sn+1 and Sn+2.

In this embodiment, the control units 821 and 822 may be constructed using digital circuits, and there are no specific restrictions on the details of their circuit architecture.

In summary, the pixel circuit of the disclosure selects different switch transistors based on low grayscale level and high grayscale level, so that switching and implementing may be accordingly performed between two driving transistors with different transfer characteristic curves. In this way, the pixel circuit can still achieve fine voltage control corresponding to low grayscale display needs, and the dark field contrast performance of the display panel is thereby improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel circuit, comprising:

two switch transistors, wherein each of the switch transistors has a channel, a switch source, and a switch gate, a first potential difference between each switch gate and the corresponding switch source has a potential interval that enables the corresponding channel to be turned on, the two potential intervals of the two switch transistors do not overlap with each other;

a scan line electrically connected to the switch gate of each switch transistor and configured to transmit a selection signal to enable one of the two first potential differences to be located in the corresponding potential interval;

two driving transistors, wherein each of the driving transistors has a driving source and a driving gate, each of the driving gates is connected to the channel of each of the corresponding switch transistors, a second potential difference is provided between each of the driving gates and the corresponding driving source, wherein in a saturation operation condition, transfer characteristic curves of the two driving transistors corresponding to the same second potential difference have different tangent slopes, at least one signal source electrically connected to one end of each of the two driving transistors;

a light-emitting component electrically connected to the other end of each of the two driving transistors or electrically connected between the signal source and the end of the two driving transistors, and a control line coupled to the two channels of the two switch transistors and configured to transmit a control signal through the turned-on switch transistor to the two driving gates.

2. The pixel circuit according to claim 1, wherein the signal source comprises:

two voltage sources coupled to the end of each of the two driving transistors.

3. The pixel circuit according to claim 1, further comprising:

a storage capacitor coupled between the switch gates of the two switch transistors and a reference grounding terminal and configured to hold a potential of the selection signal on each of the two switch gates.

4. The pixel circuit according to claim 3, further comprising:

at least one potential holding switch configured to transmit the selection signal when it is turned on and is turned off when a potential on the storage capacitor is equal to the potential of the selection signal.

5. The pixel circuit according to claim 1, wherein the control line and the scan line are the same line.

6. The pixel circuit according to claim 1, wherein the two switch transistors have a same threshold voltage absolute value.

7. The pixel circuit according to claim 1, wherein one of the two switch transistors is a P-type metal-oxide-semiconductor field-effect transistor, and the other one is an N-type metal-oxide-semiconductor field-effect transistor.

8. The pixel circuit according to claim 1, wherein one of the two switch transistors is an enhancement-type metal-oxide-semiconductor field-effect transistor, and the other one is a depletion-type metal-oxide-semiconductor field-effect transistor.

9. The pixel circuit according to claim 1, wherein the selection signal controls the two first potential differences corresponding to the turning-on of the two channels to have a same polarity, or one of the first potential differences is zero.

10. The pixel circuit according to claim 1, wherein the two driving transistors are divided into a first driving transistor and a second driving transistor, and when the light-emitting component is enabled, only one of the first driving transistor and the second driving transistor receives a control signal from the correspondingly connected channel and is turned on, so that the signal source is written into the light-emitting component.

11. The pixel circuit according to claim 10, wherein a tangent slope of the first driving transistor is a first slope, a tangent slope of the second driving transistor is a second slope, and an absolute value of the second slope is greater than an absolute value of the first slope, wherein the signal source is written into the light-emitting component via the first driving transistor or the second driving transistor, so that the light-emitting component emits light based on a first grayscale level interval or a second grayscale level interval, and a grayscale level of the second grayscale level interval is greater than a grayscale level of the first grayscale level interval.

12. The pixel circuit according to claim 11, wherein the number of grayscale levels of the second grayscale level interval is more than 1.5 times the number of grayscale level of the first grayscale level interval.

13. The pixel circuit according to claim 11, wherein the absolute value of the second slope is more than twice the absolute value of the first slope.

14. A display panel, comprising:

a substrate;

a plurality of pixel circuits according to claim 1;

a plurality of control lines, wherein each of the control lines is electrically connected between the two channels of the two switch transistors in one of the pixel circuit and is configured to transmit a control signal to the two driving gates; and a plurality control units, wherein each of the control units is electrically connected to part of the pixel circuits and controls the output of the selection signals, the control signals, and the signal sources.

* * * * *